May 12, 1953     W. J. HOLT, JR     2,638,569
CONTROL CIRCUIT FOR ELECTRIC TRANSLATING SYSTEMS
Filed July 30, 1949
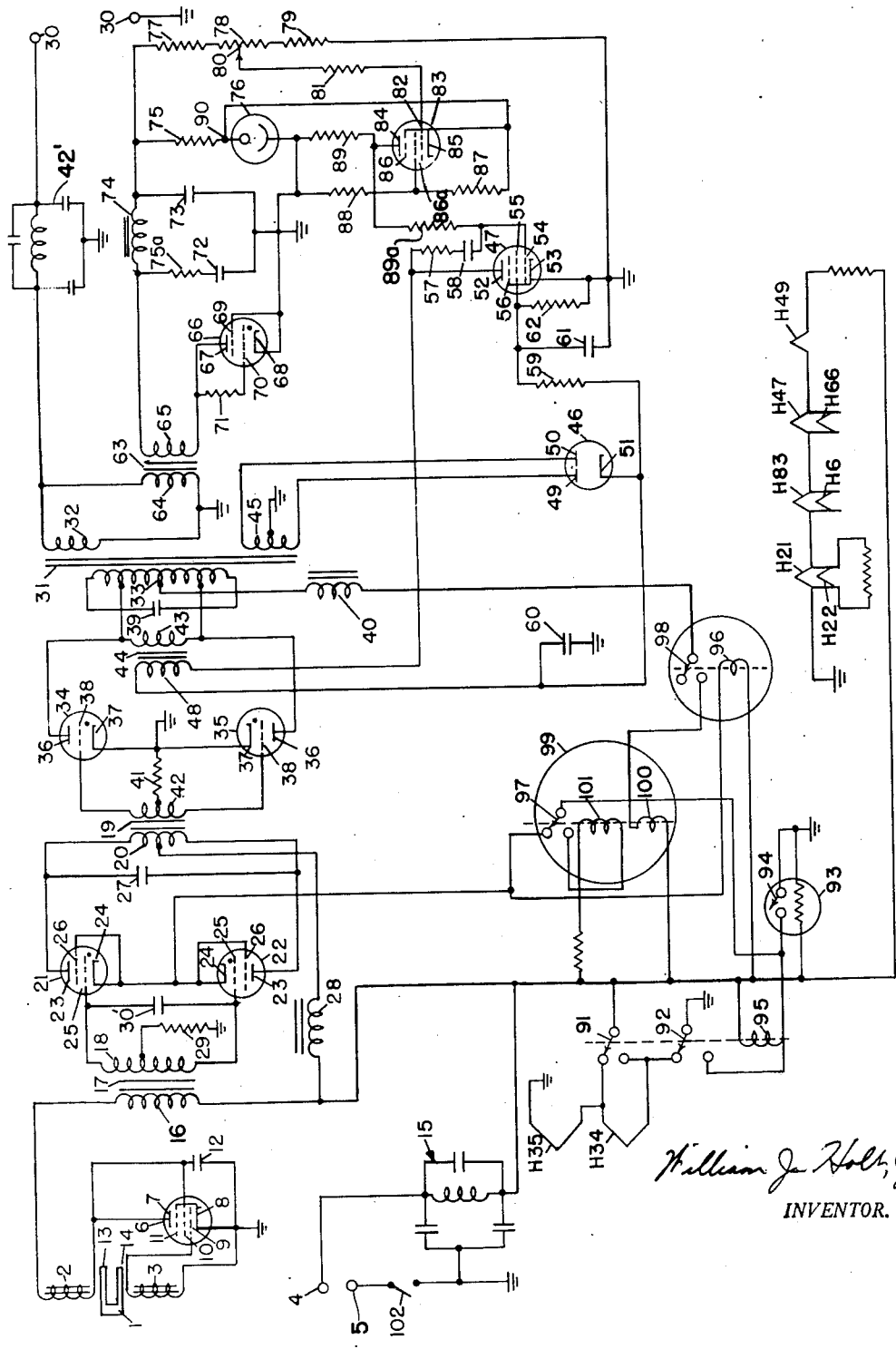
*William J. Holt, Jr.*
INVENTOR.

Patented May 12, 1953

2,638,569

UNITED STATES PATENT OFFICE 2,638,569

CONTROL CIRCUIT FOR ELECTRIC TRANSLATING SYSTEMS

William J. Holt, Jr., Garland, Tex.

Application July 30, 1949, Serial No. 107,733

18 Claims. (Cl. 321—14)

My invention relates to electric circuits and more particularly to electric control circuits for electric translating systems for energizing an alternating current load circuit from a direct current supply circuit.

In many applications it is important to supply a substantially constant voltage alternating current to the associated load circuit and to remove the voltage applied to the electric translating apparatus and the load circuit in the event of an overload. It is also important to provide an electric translating system which is quickly brought to operating condition. In accordance with the teachings of my invention, I provide a new and improved control circuit which operates to maintain the load voltage substantially constant, which protects the electric translating apparatus and the load circuit in the event of an overload, and which functions to place the electric translating systems quickly in operation.

It is an object of my invention to provide a new and improved voltage regulating means.

It is another object of my invention to provide a new and improved electric regulating system for electric translating apparatus of the type comprising unidirectionally conducting means such as electric valves.

It is another object of my invention to provide a new and improved electric translating apparatus of the type comprising an auxiliary alternating current supply circuit and a direct current supply circuit for supplying alternating current to a load circuit.

It is another object of my invention to provide a new and improved control circuit to remove the voltage applied to the electric translating system and the load circuit in the event of an overload.

It is still another object of my invention to provide a new and improved control circuit for quickly rendering the electric translating system operative.

Briefly stated, in the illustrated embodiment of my invention I provide an improved regulating system for supplying alternating current to a load circuit from a direct current supply circuit. The system comprises a main inverter having a transformer, a capacitor connected across the primary winding of the transformer, and unidirectional conducting means, such as electric valves, and also includes a saturable reactor connected across the transformer which serves to maintain the load voltage constant. The reactor is provided with a control or saturating winding which is variably energized by means of an electric discharge means. The control winding and the electric discharge means are energized in accordance with the voltage of the secondary winding of the transformer. A voltage sensitive circuit or voltage controlling circuit is connected across the secondary winding of the transformer to control the conductivity of the electric discharge device and, hence, to control the current transmitted to the control winding to maintain the load voltage constant. The system also comprises an amplifying inverter to supply the main inverter with an amplified alternating current, an overload relay circuit to remove the plate voltage from the unidirectional conducting means in the event of an overload, and a time delay relay to subject the heaters of the unidirectional conducting means to a large initial voltage in order to shorten the warm-up time of the unidirectional conducting means.

For a better understanding of my invention, reference may be had to the following description taken in connection with the accompanying drawing, and its scope will be pointed out in the appended claims. The single figure of the accompanying drawing illustrates diagrammatically a preferred embodiment of my invention for translating direct current into alternating current of constant voltage.

Referring now to the single figure of the drawing, I provide a source of current of a predetermined frequency which comprises a tuning fork 1 positioned between an electromagnet 2 and a pick-up coil 3. Electromagnet 2 is energized by direct current from direct current supply circuit 4, 5 through an electric discharge means 6. The electric discharge means 6 is preferably of the high vacuum type and comprises an anode 7, a cathode 8, a control grid 9, a screen grid 10, and a suppressor grid 11 which is connected to cathode 8. Screen grid 10 is connected to the anode 7 and also to the cathode 8 through a condenser 12. Electromagnet 2 is connected to the direct current supply circuit 4, 5 through a noise filter 15, the primary winding 16 of a transformer 17, and the electric discharge means 6. Pick-up coil 3 is connected between control grid 9 and cathode 8.

Electromagnet 2 attracts tines 13 of the tuning fork 1 when current is transmitted by electric discharge means 6. The motion of the tines of a tuning fork being substantially symmetrical with respect to each other, the opposite tine 14 of fork 1 simultaneously moves closer to the pick-up coil 3, thereby inducing a negative potential on control grid 9. Control grid 9 now having a negative potential with respect to cathode 9, less current is transmitted by electric discharge means 6. The current flowing through electromagnet 2 and the attraction of electromagnet 2 for tine 13 are, therefore, decreased. The elasticity of fork 1 returns tines 13, 14 to their initial positions and their inertia carries them still further from electromagnet 2 and pick-up coil 3, respectively. In moving away from pick-up coil 3, tine 14 induces a positive potential on control grid 9 which causes electric discharge means 6 to transmit more current. The current flowing through electromagnet 2 and the attraction of electromagnet 2 for tine 13 are therefore increased. Tuning fork 1 oscillates at its natural frequency and a pulsating current of this frequency is caused to flow through primary winding 16 of transformer 17. The pulsating current flowing through electromagnet 2 and primary winding 16 is of substantially sine wave form and induces potentials of the same wave form in secondary winding 18 of transformer 17.

Where the voltage of the direct current supply circuit 4, 5 is of relatively low voltage, say 28 volts, the potentials induced in secondary winding 18 do not supply the high grid drive voltage required by electric valves 34 and 35 of the main inverter, which will be described later. A conventional amplifier also could not supply the required high grid drive voltage since the voltage of the direct current supply circuit cannot supply the high plate voltage required by the conventional amplifier. In accordance with my invention, I provide an auxiliary inverter to convert the potentials induced in secondary winding 18 into alternating current of a relatively high voltage.

The auxiliary inverter comprises a transformer 19 provided with a primary winding 20 having its electrical midpoint connected to side 4 of the direct current supply circuit 4, 5 and end terminals connected to the other side 5 of the supply circuit through electric valves 21 and 22. Electric valves 21 and 22 are each provided with an anode 23, a cathode 24, a control grid 25, and a screen grid 26 connected to cathode 24, and may be of any of the several types well known in the art, although I prefer to employ electric valves of the gaseous discharge type. A commutating capacitor 27 is connected between the anodes 23 of the valves 21 and 22 and a smoothing reactor 28 is connected between direct current supply circuit 4, 5 and the midpoint of primary winding 20. In order periodically to render the valves 21 and 22 alternately conductive and nonconductive, their control grids 25 are connected to their common cathode circuit through current limiting resistance 29 and opposite halves of secondary winding 18. Current limiting resistance 29 is connected between the electrical midpoint of secondary winding 18 and side 5 of direct current supply circuit 4, 5, and provides a high resistance path for current flow from cathodes 24 to grids 25. Condenser 30' shapes the output voltage of winding 18 in such a fashion that it is essentially a sine wave.

The general principles of operation of the above described inverter will be well understood by those skilled in the art. In brief, if one of the valves, for example, the valve 21, is initially rendered conductive, current will flow through the upper portion of winding 20 and valve 21 inducing one half cycle of alternating current in the secondary winding 42 of transformer 19. During this interval the capacitor 27 becomes charged to substantially twice the potential of the direct current source 4, 5, and, when the grid potential supplied by secondary winding 18 reverses polarity to render the valve 22 conductive, the potential of capacitor 27 is effective to commutate the current from the valve 21 to the valve 22. Current now flows through the lower portion of winding 20 inducing a half cycle of alternating current of opposite polarity in the secondary winding 42 of the transformer 19. In this manner the current is successively commutated between the valves 21 and 22 and an alternating current is induced in the secondary winding 42 of transformer 19. The alternating current induced in secondary winding 42 is employed to excite the control grids of the electric valves in a main inverter.

The main inverter transmits energy from direct current supply circuit 4, 5 to an alternating current load circuit 30. This inverter comprises a transformer 31 provided with a secondary winding 32 connected to the alternating current load circuit 30 and a primary winding 33 provided with an electrical midpoint connected to one side 4 of the direct current supply circuit 4, 5 and end terminals connected to the other side 5 through electric valves 34 and 35. Electric valves 34 and 35 are each provided with an anode 36, a cathode 37 and a control grid 38 and may be of any of the several types well known in the art although I prefer to employ electric valves of the gaseous discharge type. Electric valves 34 and 35 are of greater capacity and require a greater grid drive voltage than valves 21 and 22. Valves 34 and 35 may be C3A14 thyratrons while valves 21 and 22 may be GL-546 thyratrons. A commutating capacitor 39 is connected across the primary winding 33 of transformer 31 and a smoothing reactor 40 is connected between side 4 of direct current supply circuit 4, 5 and the electrical midpoint of primary winding 33. In order periodically to render valves 34 and 35 alternately conductive and nonconductive, their control grids 38 are connected to their common cathode circuit through current limiting resistance 41 and opposite halves of the secondary winding 42 of the transformer 19. Current limiting resistance 41 is connected between the electrical midpoint of secondary winding 42 and side 5 of the direct current supply circuit 4, 5.

The main inverter operates in exactly the same manner as the auxiliary inverter to produce an alternating current in secondary winding 32 of transformer 31. A filter 42' may be provided to filter noise from the alternating current transmitted to alternating current circuit 30.

In order to control the voltage of the alternating current circuit 30, the reactive winding 43 of a saturable reactor 44 is connected between the anodes 36 of valves 34 and 35 and across an intermediate portion of primary winding 33. Commutating capacitor 39, however, is connected across the whole of primary winding 33. Since capacitor 39 is connected across all of winding 33, a greater potential is impressed upon the capacitor 39 than if it were connected in parallel with the same small portion of the winding 33 as reactive winding 43. The energy stored in capacitor 39 being proportional to the square of the voltage impressed upon it, a great saving in capacitor size can be effected by charging capacitor 40 to a higher potential.

An auxiliary secondary winding 45 of transformer 31 is connected through an electric valve 46 and an electric discharge means 47 to the saturating winding 48 of saturable reactor 44. Electric valve 46 is a full wave rectifier and comprises anodes 49 and 50 and a cathode 51. Electric discharge means 47, preferably of the high vacuum type, comprises an anode 52, a cathode 53, a control grid 54, a screen grid 55, and a suppressor grid 56 which is connected to cathode 53. Anode 52 is connected to control grid 54 through a resistance 57 and a capacitance 58 to prevent high frequency oscillation of electric discharge means 47. Screen grid 55 is connected to ground through resistance 59 and capacitor 60 and also through capacitor 61 and through resistance 62.

It can be seen now that saturable reactor 44 and commutating capacitor 39 comprise a parallel resonant circuit. If the impedance of saturable reactor 44 is increased, the voltage across primary winding 33 is increased. As a result, the voltage across secondary winding 32 also is increased. Conversely, if the impedance of saturable reactor 44 is decreased, the voltage across secondary winding 32 is decreased. The impedance of saturable reactor 44 can be controlled by varying the conductivity of electric discharge means 47. If the conductivity of electric discharge means 47 increases with an increase of the voltage of alternating current circuit 30, the current flowing in saturating winding 48 is increased and the impedance of saturable reactor 44 is decreased. This causes a decrease in the voltage of alternating current circuit 30. On the other hand, if the conductivity of electric discharge means 47 is decreased, the impedance of saturable reactor 44 is increased and the voltage of alternating circuit 30 is increased.

The control means for varying the conductivity of electric discharge means 47 comprises a voltage sensing transformer 63. An electric valve 66 which acts as a rectifier is connected to secondary winding 65. Electric valve 66 comprises an anode 67, a cathode 68, a suppressor grid 69 which is connected to the cathode 68, and a control grid 70 which is connected to the anode 67 through the resistance 71. Connected across the secondary winding 65 and valve 66 is a filter which may comprise condensers 72 and 73, a reactor 74, and a resistance 75a. Also connected across secondary winding 65 and electric valve 66 is a voltage divider comprising in series relation a resistance 75 and a glow discharge valve 76 which acts as a voltage regulator. Another voltage divider comprising serially connected resistances 77, 78 and 79 is also connected across secondary winding 65 and valve 66.

A voltage control or voltage adjusting contact 80 connects resistance 78, through a resistance 81, to the control grid 82 of an electric discharge means 83 and impresses on the control grid 82 a potential which varies in accordance with the voltage of secondary winding 65 and therefore with the voltage of alternating current circuit 30. Electric discharge means 83 comprises, in addition to control grid 82, an anode 84, a cathode 85, a suppressor grid 86 connected to the cathode 85, and a screen grid 86a connected to cathode 85 through a resistance 87 and to ground through resistance 88. Electric discharge means 83 is connected in series relation with resistance 89 across glow discharge valve 76. Anode 84 of electric discharge means 83 is connected through a resistance 89a to control grid 54 of electric discharge means 47 to impress on the control grid 54 a potential which varies in accordance with the voltage of alternating current circuit 30.

The common juncture 90 of glow discharge valve 76 and resistance 75 is connected to the cathode 85, thereby maintaining its potential substantially constant with respect to ground. The potential of grid 82, however, varies in accordance with the voltage of the voltage divider which comprises resistances 77, 78 and 79. Thus, when the voltage of secondary windings 32 and 65 increases, a more negative potential is impressed on control grid 82 of electric discharge means 83. Discharge means 83 amplifies the change in potential of grid 82 and impresses a more positive potential on grid 54 of electric discharge means 47. Electric discharge means 47, therefore, becomes more conductive and transmits more current through saturating winding 48, the impedance of saturable reactor 44 is decreased, and the voltage of alternating current circuit 30 is decreased. Conversely, when the voltage of secondary windings 32 and 65 is decreased, the conductivity of electric discharge means 47 is decreased and the voltage of alternating current circuit 30 is increased. The voltage of alternating circuit 30 can thus be maintained constant.

The exact voltage to be maintained across alternating current circuit 30 can be set by adjusting the position of voltage adjusting contact 80 on resistance 78. The position of contact 80 on resistance 78 determines the bias on control grid 82 and, hence, the current flowing in saturating winding 48 under normal conditions of output voltage.

While I prefer to use saturable reactor 44 connected across primary winding 33 of transformer 31, it may be connected across the secondary winding 32 if desired. Indeed, the inverter will operate with both the commutating capacitor 39 and the saturable reactor 44 connected in parallel across secondary winding 32. I have found that the position of the saturable reactor 44 illustrated in the drawing leads to greatest efficiency of the translating apparatus.

I provide a time delay relay circuit to decrease the time necessary to warm up heaters H34 and H35 of electric valves 34 and 35, respectively. At the initiation of operation of the apparatus, heaters H34 and H35 are connected in parallel across direct current supply circuit 4, 5 through contacts 91 and 92. A thermal time delay relay 93 is also connected across direct current circuit 4, 5 which, when warmed up, actuates contact 94 and energizes relay winding 95. Relay winding 95, when energized, actuates contacts 91 and 92 and connects heaters H34 and H35 in series relation across the direct current supply circuit 4, 5. It can be seen, then, that each of the heaters H34 and H35 is started on double the operating voltage and that each is operated on one half the voltage of the direct current supply circuit 4, 5 after the actuation of thermal time delay relay 94. Heaters H6, H21, H22, H47, H49, H66 and H83 of electric valves 6, 21, 22, 47, 49, 66 and 83, respectively, are immediately energized at the initiation of operation of the apparatus since they are directly connected across the direct current supply circuit 4, 5.

A relay winding 96 is connected to ground through contacts 97 and 94. Contact 97 is normally in closed position so that when contact 94 is actuated, relay winding 96 is energized and closes contact 98 applying the direct current voltage of direct current supply circuit 4, 5 to the anode-cathode circuits of electric valves 34 and 35. Simultaneously the cathodes 24 of electric valves 21 and 22 are connected to ground through contacts 97 and 94. With contacts 91, 92, 94 and 98 in their actuated conditions, the apparatus is in operating condition and an alternating current appears in alternating current load circuit 30.

I provide an overload relay 99 to protect the apparatus from an overload condition, such as a short circuit in the alternating current load circuit 30. Overload relay 99 comprises a relay winding 100 connected in series relation with contact 98 in the direct current supply circuit of primary winding 33 of transformer 31. Relay winding 100 is therefore energized when contact 98 is actuated. Under normal operating conditions, the amount of current flowing through relay winding 100 is not sufficient to actuate contact 97. In the event of an overload condition, a heavy surge of current will flow through relay winding 100 and contact 97 will be actuated to disconnect relay winding 96 and the anode-cathode circuits of electric valves 21 and 22 from direct current supply circuit 4, 5. Relay winding 96 will be de-energized and contact 98 will return to its initial position disconnecting the anode-cathode circuits of electric valves 34 and 35 from direct current supply circuit 4, 5. At the same time, relay winding 101 will be connected to direct current supply circuit 4, 5 by contact 97 and will lock in contact 97 in its actuated position. With contact 98 in its normal position and contact 97 in its actuated position, the heaters of the various valves will continue to be energized and tuning fork 1 will continue to vibrate, only the electric valves 21, 22, 34 and 35 being inoperative. The apparatus will be in a condition to resume normal operation once the relay contacts 97 and 98 are returned to the positions they occupy during normal operation. In order to restart operation, a switch 102 is provided in direct current circuit 4, 5 which is opened to return all contacts to their initial positions. Switch 102 is then closed and an alternating current is immediately applied to load circuit 30 since the thermal time delay relay 93 has not had an opportunity to cool off.

While I have shown and described my invention as applied to a particular system of connections and as embodying various devices diagrammatically shown, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination: a direct current supply circuit; an alternating current load circuit; an energy translating means comprising an inductive winding, a capacitor in parallel with said inductive winding, and a plurality of electric valves connected between said direct current supply circuit and said inductive winding; a variable inductance connected across said capacitor and comprising a direct current saturating winding; an energizing circuit for energizing said saturating winding with direct current, said energizing circuit comprising a rectifying means operatively associated with said inductive winding; and means responsive to changes in the alternating current load circuit voltage for varying the energization of said saturating winding.

2. In combination: a direct current supply circuit; an alternating current load circuit; an energy translating means comprising an inductive winding, a capacitor in parallel with said inductive winding, and a plurality of electric valves connected between said direct current supply circuit and said inductive winding; a variable inductance connected across said capacitor and comprising a direct current saturating winding; an energizing circuit for energizing said saturating winding with direct current, said energizing circuit comprising a rectifying means operatively associated with said inductive winding; and means responsive to changes in the alternating current load circuit voltage for varying the energization of said saturating winding, said last named means comprising an amplifier for causing a substantial change in energizing circuit current upon a slight change in the voltage of said alternating current load circuit.

3. In combination, a direct current supply circuit; an alternating current load circuit; electric translating apparatus connected between said circuits and comprising a transformer having a primary winding and a first secondary winding, a plurality of electric valves connected between said primary winding and said direct current supply circuit, and a capacitor connected across one of said windings; a saturable reactor connected across said capacitor, said saturable reactor comprising a saturating winding for controlling the impedance of said reactor; means for supplying direct current to said saturating winding comprising a second secondary winding on said transformer and a rectifying means operatively associated with said second secondary winding; and voltage sensing means operatively associated with said first secondary winding for varying the current in said control winding in accordance with the voltage of said alternating current load circuit.

4. In combination: a direct current supply circuit; an alternating current load circuit; electric translating apparatus connected between said circuits and comprising a transformer having a primary winding and a first secondary winding; a plurality of electric valves connected between the primary winding and said direct current supply circuit, and a capacitor connected across one of said windings; a saturable reactor connected across one of said windings and having a saturating winding for controlling the impedance of said reactor; means for supplying direct current to said saturating winding comprising a second secondary winding on said transformer and a rectifying means operatively associated with said secondary winding; and voltage sensing means operatively associated with said first secondary winding for varying the direct current in said saturating winding in accordance with the voltage of said alternating current load circuit.

5. In combination, a direct current supply circuit; an alternating current load circuit; electric translating apparatus connected between said circuits and comprising a transformer having a primary winding and a first secondary winding, a plurality of electric valves connected between the primary winding and said direct current supply circuit, and a commutating capacitor connected across one of said windings; a saturable reactor connected across one of said windings and comprising a saturating winding for controlling the impedance of said reactor; means for supplying direct current to said control winding, said means comprising a second secondary winding on said transformer connected to said control winding through a rectifying means and a current controlling means; and voltage sensing means operatively associated with said current control means for varying the direct current in said control winding in accordance with the voltage of said alternating current load circuit.

6. In combination, a direct current supply circuit; an alternating current load circuit; electric translating apparatus connected between said circuits and comprising a transformer having a primary winding and a first secondary winding, a plurality of electric valves connected between the primary winding and said direct current supply circuit, and a commutating capacitor connected across one of said windings; a saturable reactor connected across one of said windings and comprising a saturating winding for controlling the impedance of said reactor; means for supplying direct current to said control winding, said means comprising a second secondary winding on said transformer connected to said control winding through a rectifying means and a current controlling means; and voltage sensing means operatively associated with said current control means for varying the direct current in said control winding in accordance with the voltage of said alternating current load circuit, said voltage sensing means comprising amplifier means for causing a substantial change in the direct current in said control winding upon a slight change in the voltage of said alternating current load circuit.

7. In combination, a direct current supply circuit; an alternating current load circuit; electric translating apparatus connected between said circuits and comprising a transformer having a primary winding and a first secondary winding, a plurality of electric valves connected between the primary winding and said direct current supply circuit, and a capacitor connected across one of said windings; a saturable reactor connected across said capacitor and comprising a saturating winding for controlling the impedance of said reactor; means for supplying direct current to said saturating winding comprising a second secondary winding on said transformer connected to said control winding through a rectifying means; an electric discharge means for controlling the current in said saturating winding, said electric discharge means comprising an anode, a cathode, and a control grid; and voltage sensing means for impressing a potential on said control grid which varies in accordance with the voltage of said alternating current load circuit.

8. In combination, a direct current supply circuit; an alternating current load circuit; electric translating apparatus connected between said circuits and comprising a transformer having a primary winding and a first secondary winding, a plurality of electric valves connected between the primary winding and said direct current supply circuit, and a capacitor connected across one of said windings; a saturable reactor connected across said capacitor and comprising a saturating winding for controlling the impedance of said reactor; means for supplying direct current to said saturating winding comprising a second secondary winding on said transformer connected to said control winding through a rectifying means; an electric discharge means for controlling the current in said saturating winding, said electric discharge means comprising an anode, a cathode, and a control grid; and voltage sensing means for impressing a potential on said control grid which varies in accordance with the voltage of said alternating current load circuit, said voltage sensing means comprising amplifying means for causing a substantial change in the direct current in said saturating winding upon a slight change in the voltage of said alternating current load circuit by amplifying the potential impressed on said control grid.

9. In combination: a direct current supply circuit; an alternating current load circuit; an electric translating apparatus connected between said circuits and comprising a transformer having a primary winding connected to said direct current supply circuit and a first secondary winding connected to said alternating current load circuit, a plurality of electric valves connected between said primary winding and said direct current supply circuit, and a commutating capacitor connected across said primary winding; a saturable reactor comprising a reactive winding connected across one of said windings and a saturating winding for varying the impedance of said reactive winding; a second secondary winding on said transformer connected to a rectifying means for supplying direct current to said saturating winding; an electric discharge means operatively associated with said saturating winding; and voltage sensing means operatively associated with said alternating current load circuit for controlling the conductivity of said electric discharge means in accordance with the voltage of said alternating current load circuit.

10. In combination: a direct current supply circuit; an alternating current load circuit; an electric translating apparatus connected between said circuits and comprising a transformer having a primary winding connected to said direct current supply circuit and a first secondary winding connected to said alternating current load circuit, a plurality of electric valves connected between said primary winding and said direct current supply circuit, and a commutating capacitor connected across said primary winding; a saturable reactor comprising a reactive winding connected across one of said windings and a saturating winding for varying the impedance of said reactive winding; a second secondary winding on said transformer connected to a rectifying means for supplying direct current to said saturating winding; an electric discharge means connected in series with said saturating winding; voltage sensing means connected across said alternating current supply circuit for varying conductivity of said electric discharge means in accordance with the voltage of said alternating current load circuit; and amplifying means operatively associated with said voltage sensing means for producing a substantial change in the conductivity of said electric discharge means upon a slight change in the voltage of said alternating current load circuit.

11. In combination: a direct current supply circuit; an alternating current load circuit; electric translating means comprising an inductive winding and a plurality of electric valves for transmitting electrical energy between said circuits, said electric valves having heating elements; means for shortening the period of time required to bring said heater elements to normal operating temperature comprising first and second contacts to initially connect said heater elements in parallel across said direct current supply circuit; a first means for actuating said contacts after a predetermined time after initiation of operation to connect said heater elements in series relation across said direct current supply circuit; a second means responsive to operation of said first means connecting said electric valves to said direct current supply circuit; and a third means responsive to an overload condition in said electric translating means for disconnecting said electric valves from said direct current supply circuit, said heater elements remaining connected across said direct current supply circuit after operation of said third means.

12. In combination: an electric translating means for energizing an alternating current load circuit comprising a plurality of electric valves, each of said electric valves having an anode, a cathode and a heating means for said cathode; a direct current supply circuit for energizing the anode-cathode circuits and said heating means of said valves; a first means for initially connecting said heating means in parallel across said direct current supply circuit; a second means for connecting said heating elements in series across said direct current supply circuit a predetermined period of time after initiation of operation; and a third means responsive to operation of said second means for connecting said anode-cathode circuits of said electric valves across said direct current supply circuit after said predetermined period of time; and a fourth means responsive to an overload condition in said electric translating means for disconnecting said anode-cathode circuits from said direct current supply circuit.

13. In combination: a direct current supply circuit; an alternating current load circuit; a main electric translating means connected between said circuits and comprising a first pair of electric valves, said valves each having a control grid; an auxiliary electric translating means connected between said direct current supply circuit and said control grids for supplying an alternating potential to said control grids to render said electric valves alternately conductive, said auxiliary translating means comprising a transformer having a primary winding and a secondary winding, a second pair of electric valves connected between said primary winding and said direct current supply circuit, and a commutating capacitor connected across one of said windings, said secondary winding being connected to said control grids of said first pair of electric valves, each of said second pair of electric valves having a control grid; and means operatively associated with said control grids of said second pair of electric valves for impressing an alternating potential of a predetermined frequency on said control grids of said second pair of electric valves to render said electric valves of said second pair of electric valves alternately conductive, said auxiliary electric translating means acting as an amplifying means for amplifying said last mentioned alternating potential and impressing it on said control grids of said first pair of electric valves.

14. In combination: a direct current supply circuit; an alternating current load circuit; a main electric translating means connected between said circuits and comprising a first pair of electric valves, said valves each having a control grid; an auxiliary electric translating means connected between said direct current supply circuit and said control grids for supplying an alternating potential to said control grids to render said electric valves alternately conductive, said auxiliary translating means comprising a transformer having a primary winding and a secondary winding, a second pair of electric valves connected between said primary winding and said direct current supply circuit, and a commutating capacitor connected across one of said windings, said secondary winding being connected to said control grids of said first pair of electric valves, each of said second pair of electric valves having a control grid; and means energized from said direct current supply circuit and operatively associated with said control grids of said second pair of electric valves for impressing an alternating potential of a predetermined frequency on said control grids of said second pair of electric valves to render said electric valves of said second pair of electric valves alternately conductive, said auxiliary electric translating means acting as an amplifying means for amplifying said last mentioned alternating potential and impressing it on said control grids of said first pair of electric valves.

15. In combination: a direct current supply circuit; an alternating current load circuit; electric translating apparatus connected between said circuits and comprising a transformer having a primary winding and a secondary winding, a plurality of electric valves connected between said primary winding and said direct current supply circuit, and a capacitor connected across one of said windings; a saturable reactor having a reactive winding connected across one of said transformer windings and having a saturating winding for controlling the impedance of said reactive winding; means for energizing said saturating winding with direct current, said energizing means comprising a rectifying means energized from said transformer; and means responsive to changes in the alternating current load circuit for varying the energization of said saturating winding in accordance with the voltage of said alternating current load circuit.

16. In combination: a direct current supply circuit; an alternating current load circuit; electric translating apparatus connected between said circuits and comprising a transformer having a primary winding and a secondary winding, a plurality of electric valves connected between said primary winding and said direct current supply circuit, and a capacitor connected across one of said windings; a saturable reactor having a reactive winding connected across one of said transformer windings and having a saturating winding for controlling the impedance of said reactive winding; means for supplying direct current to said saturating winding, said means comprising a rectifying means energized from said transformer and a current controlling means; and voltage sensing means operatively associated with said current control means for varying the direct current in said saturating winding in accordance with the voltage of said alternating current load circuit.

17. In combination: a direct current supply circuit; an alternating current load circuit; electric translating apparatus connected between said circuits and comprising a transformer having a primary winding and a secondary winding, a plurality of electric valves connected between said primary winding and said direct current supply circuit, and a capacitor connected across one of said windings; a saturable reactor having a reactive winding connected across one of said transformer windings and having a saturating winding for controlling the impedance of said reactive winding; means for supplying direct current to said saturating winding, said means comprising a rectifying means energized from said transformer and a current controlling means; and voltage sensing means operatively associated with said current control means for varying the direct current in said saturating winding in accordance with the voltage of said alternating current load circuit, said voltage sensing means comprising amplifier means for causing a substantial change in the direct current in said saturating winding upon a slight change in the voltage of said alternating load circuit.

18. In combination: a direct current supply circuit; an alternating current load circuit; electric translating apparatus connected between said circuits and comprising a transformer having a primary winding and a secondary winding, a plurality of electric valves connected between said primary winding and said direct current supply circuit, and a capacitor connected across one of said windings; a saturable reactor having a reactive winding connected across one of said transformer windings and having a saturating winding for controlling the impedance of said reactive winding; means for supplying direct current to said saturating winding, said means comprising a rectifying means energized from said transformer; an electric discharge means for controlling the current in said saturating winding, said electric discharge means comprising an anode, a cathode, and a control grid; and voltage sensing means comprising for impressing a potential on said control grid which varies in accordance with the voltage of said alternating current load circuit, said voltage sensing means comprising amplifying means for causing a substantial change in said saturating winding upon a slight change in the voltage of said alternating current load circuit by amplifying the potential impressed on said control grid.

WILLIAM J. HOLT, JR.

References Cited in the file of this patent

UNITED STATES PATENTS

| Number | Name | Date |
|---|---|---|
| 1,975,441 | Wuerfel | Oct. 2, 1934 |
| 2,248,821 | Heselton et al. | July 8, 1941 |
| 2,333,502 | Wickham | Nov. 2, 1943 |
| 2,386,548 | Fogel | Oct. 9, 1945 |

FOREIGN PATENTS

| Number | Country | Date |
|---|---|---|
| 429,230 | Great Britain | May 27, 1935 |